United States Patent Office 3,456,294
Patented July 22, 1969

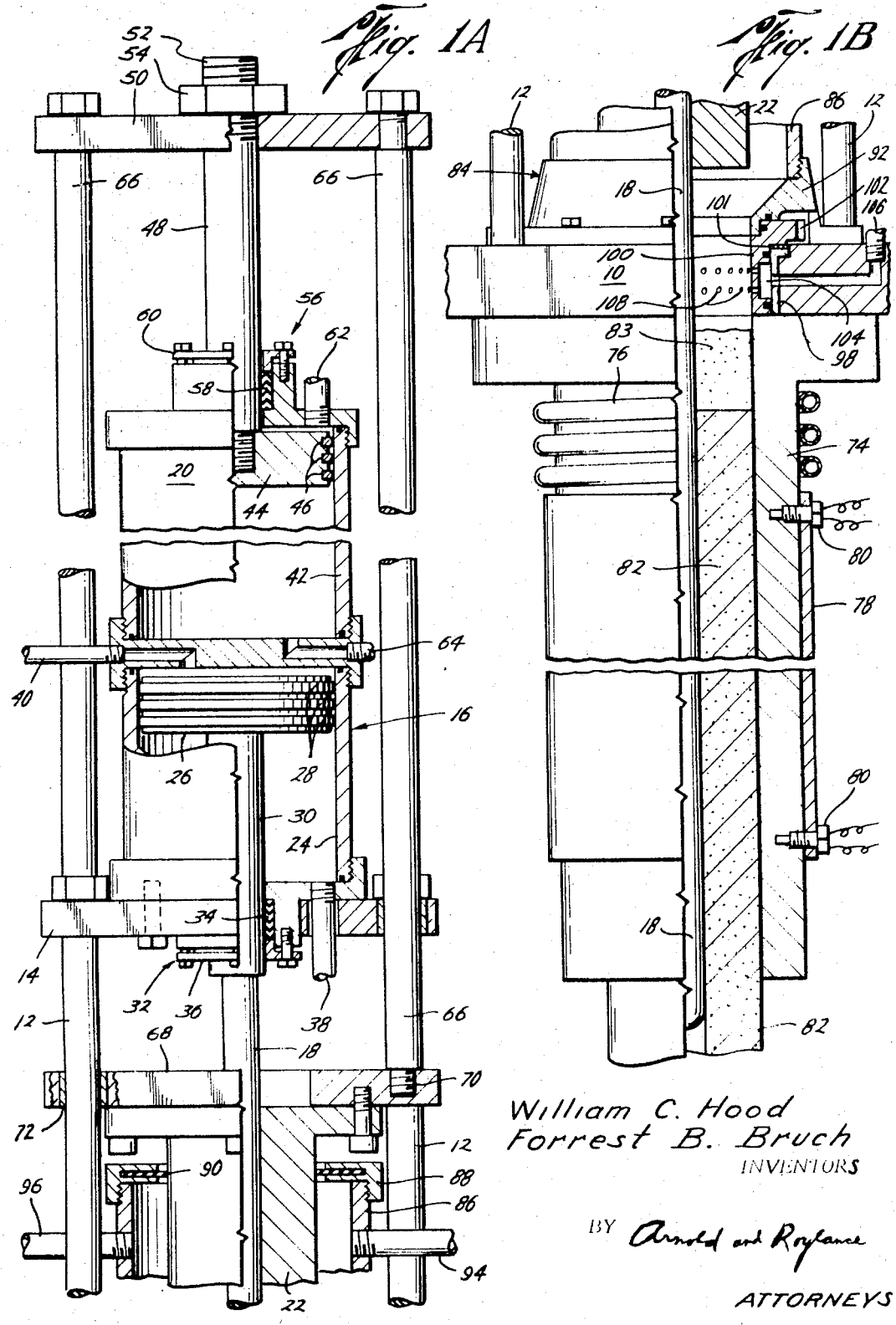

3,456,294
APPARATUS FOR EXTRUSION
William C. Hood and Forrest B. Bruch, Houston, Tex., assignors to Ethylene Gulf Coast Corporation, Houston, Tex., a corporation of Texas
Filed Jan. 18, 1966, Ser. No. 521,349
Int. Cl. B29d 23/04
U.S. Cl. 18—12        9 Claims

ABSTRACT OF THE DISCLOSURE

Apparatus for extruding thin-walled tubing is provided, which includes a barrel, a mandrel concentrically positioned in the barrel and movable longitudinally with respect to the barrel, and a ram between the barrel and mandrel. The ram reciprocally operates on a feed material between barrel and mandrel, and is movable longitudinally with respect to both barrel and mandrel. Air cylinders operate both mandrel and ram.

---

The invention concerns apparatus suitable for extrusion of tubing and other shapes, particularly thin-wall tubing, and particularly tubing prepared from tetrafluoroethylene resin or other halohydrocarbon resins.

Tetrafluoroethylene resin is characterized by extreme chemical inertness, exceptional heat resistance, toughness over a wide range of temperatures, and excellent electrical properties. The properties of the material are well-suited for many applications in the chemical, electrical, and other industries.

Fabricating methods generally used with tetrafluoroethylene resin differ from those generally employed with thermoplastics. The resin, although classed generally as a thermoplastic resin, does not melt and flow as do the conventional plastics of the class. Because of its heat resistance and general mechanical properties at high temperatures, the use of special processing techniques is necessary.

Rods, tubes, and other shapes can be produced from tetrafluoroethylene resin by extrusion. The process usually involves compacting powder with a reciprocating ram, and then forcing the compacted powder through a heated die where the powder is sintered and partially cooled within the die, and emerges as continuous solid stock.

In the extrusion of tubing, the die comprises a barrel and a mandrel disposed concentrically therein to form an annular extruding space. A ram reciprocates into and out of the annular space, while feeding tubing-extrudable material alternately, to compact the tubing extrudable material therein and force the material so compacted through the die. The extrusion of tubing, however, particularly thin-wall tubing, presents special problems in the art of extrusion. For example, it has been found that thin-wall tubing tends to be nonuniform and subject to cracks, discontinuties, and other faults more frequently than other extruded shapes.

The invention provides apparatus suitable for the extrusion of thin-wall tubing, as well as other shapes. The invention is particularly applicable to the extrusion of tetrafluoroethylene resin in particulate form, but may also be employed in the extrusion of other materials, such as halohydrocarbon resins in general.

One embodiment of apparatus in accordance with the invention comprises a die of a shape to permit extrusion of tubing therethrough, the die comprising a barrel and a mandrel disposed concentrically within the barrel to form an annular space therein around the longitudinal axis of the die, and feeding means for feeding tubing-extrudable feed material into the annular space substantially uniformly around the annular space. A ram is disposed near the feeding end of the die for compacting the tubing-extrudable material in the annular space.

As will be explained more fully hereinafter, the ram is movable with respect to both the barrel and the mandrel along the longitudinal axis of the die, and the mandrel is movable with respect to both the barrel and the ram along the longitudinal axis of the die. The apparatus also includes means for moving the ram with respect to both the barrel and the mandrel, and means for moving the mandrel with respect to both the barrel and the ram.

Preferably, the feeding means includes a plurality of gas ports spaced around the annular space to permit introduction of gas, such as air, into the annular space to help control the uniformity of feed material around the annular space. It has been found that the introduction of a plurality of gas streams into the annular space during the feeding process can improve the uniformity of feed material around the space. It has also been found, particularly in regard to tubing of relatively large diameter, that the uniformity of feed material can be improved further by rotating the gas ports and consequently the gas streams around the longitudinal axis of the die during the feeding process.

The uniformity of feed material around the annular space can also be improved by providing cooling means sufficiently near the feeding means to help control the uniformity of the feed material around the annular space. The cooling means apparently maintains a temperature in the feeding means sufficiently low to improve the uniformity of the feed material. Apparently, without the cooling means, the feeding means can become too warm from conduction from the heated portion of the die to permit uniform feeding of tubing-extrudable material.

It has also been found that tubing of improved characteristics can be produced in a die wherein the mandrel extends beyond the end of the barrel at the tubing-producing end of the die for a distance sufficient to improve the uniformity of diameter and straightness of tubing produced therein. Normally, this distance may be between about 6 and about 24 inches, preferably between about 12 and about 18 inches for most commercial sizes of tubing.

An embodiment of apparatus in accordance with the invention is shown in the drawing wherein FIG. 1A represents the top half of the apparatus D and FIG. 1B represents the lower half of the apparatus. Although the invention will be described hereinafter with reference to the drawing, it is apparent that the concepts of the invention are not limited to the particular embodiment shown, and that the concepts of the invention can be applicable in general to the extrusion art.

With reference to the drawing, a base platform 10 fixedly carries four vertically extending posts 12 (two of which are not shown) disposed apart at the corners of an imaginary square above the platform 10. The posts 12 fixedly carry a second platform 14, the platforms 10 and 14 and the posts 12 forming a base for connection of other components of the apparatus.

Fixed to the platform 14 is an air cylinder 16 for operation of a mandrel 18, and fixed in turn to the air cylinder 16 is an air cylinder 20 for operation of a ram 22.

The air cylinder 16 comprises a cylinder or barrel 24 and a piston 26 disposed therein with rings 28, preferably made of polytetrafluoroethylene, sealably engaging the cylinder 24. A piston rod 30 connects the piston 26 to the mandrel 18. The piston rod 30 extends through a packing gland 32 comprising packing 34 and a retaining ring 36. The air cylinder 16 has an air port 38 communicating with the interior of the cylinder 24 on one side of the piston 26, and a second air port 40 communicating with the interior of the cylinder 24 on the other side of the piston 26 to provide a double-acting air cylinder 16.

The air cylinder 20 has a cylinder or barrel 42 and a piston 44 disposed therein with rings 46 sealably engaging the wall of the cylinder 42. A piston rod 48 connects the piston 44 to a yoke 50 by means of threads 52 and retaining nut 54. The piston rod 48 extends out of the air cylinder 20 through packing gland 56 which comprises packing 58 and a retaining ring 60.

The air cylinder 20 also includes an air port 62 communicating with the interior of the cylinder 42 on one side of the piston 44 and an air port 64 communicating with the cylinder 42 on the other side of the piston 44 to provide a double-acting air cylinder.

Connected to the yoke 50 is a pair of rods 66 which in turn are connected to a plate 68 by means of threads 70. The plate 68 has four bearings 72 which slidably engage the posts 12 and maintain accurate alignment of the plate 68 with respect to the posts 12 and the remainder of the apparatus.

As shown in the drawing, the above-described structure may include other components for ease of construction and for sealing purposes, but since these components are apparent from the drawing they will not be described specifically herein.

Attached to the platform 10 is a barrel 74 of a shape sufficient to permit extrusion of tubing therethrough in conjunction with the mandrel 18. A cooling means, such as cooling coil 76, is preferably provided on the barrel 74 near the preforming end, and one or more heaters 78 of any suitable construction are provided around the barrel 74 to provide heat to the tubing-extrudable material in an amount sufficient to mold, sinter, or otherwise form coherent tubing from the tubing-extrudable material. Temperature indicators 80, such as thermocouples and the like may be provided in the barrel 74 to permit control of the desired extrusion temperature.

Preferably, the barrel 74 extends below the bottom of the heater 78 a sufficient distance to permit the tubing 82 to solidify and cool to a sufficiently low temperature before leaving the barrel 74. As shown in the drawing, the mandrel 18 preferably extends beyond the tubing-producing end of the barrel 74 for a distance, such as about 12 to 18 inches for most commercial shapes, sufficient to maintain uniformity in diameter and straightness of the tubing 82 as it is produced.

Attached to the platform 10 is a feeding mechanism 84 comprising a housing 86 which includes a cap 88 with a diaphragm 90, made of rubber or other suitable material, sealably engaging the ram 22 extending therethrough, and a base 92 connecting the housing 86 to the platform 10. The housing 86 has a feed inlet 94 and an air outlet 96. Preferably, the feed inlet 94 and air outlet 96 are disposed approximately 90 degrees from each other in actual operation to minimize entry of feed material into the air outlet 96.

The feeding mechanism 84 also includes a bushing 98 disposed in the platform 10, and a rotatable ring 100 disposed in the bushing 98 and against shim 101. The rotatable ring 100 includes a gear 102 which may be connected to a suitable power source in any suitable manner. The rotatable ring 100 is shaped on its outside surface to include an air conduit 104 therearound which communicates with an air inlet 106. The air conduit 104 communicates with a plurality of small gas ports 108 spaced around the interior of the rotatable ring 100 in locations, of a size, and in an amount sufficient to help control the uniformity of feed material entering the feeding mechanism 84 by way of the feed inlet 94. The gas ports 108 may have a diameter of about $\frac{1}{32}$ inch, for example, and may constitute a total from about 2 to 100 gas ports.

As shown in the drawing, O-rings may be suitably disposed between abutting surfaces if a seal is desired therebetween.

As shown in the drawings, the apparatus is in feeding position just after the feed material in the form of a powder has been carried into the housing 86 by way of the feed inlet 94 in a short burst of air or other suitable gas. A hopper carrying the feed material and communicating with an air conduit (not shown) may be employed to introduce the feed material fluidized in an air stream to the feed inlet 94. As the feed material enters the housing 86 the feed material will fall into the annular space between the barrel 74 and mandrel 18 to form a preforming charge 83 of feed material, since the extrusion apparatus is preferably vertically disposed. The air entering the housing 86 through the feed inlet 94 will pass out of thte housing 86 through the air outlet 96.

As the feed material enters the housing 86 and falls into the annular space, air is injected into the air inlet 106 which communicates with the air ports 108 in the rotatable ring 100. At the same time, the rotatable ring 100 may be rotated by way of the gear 102 by any suitable source of power. It has been found that one or more, preferably two or more, air streams disposed around the annular space in the die, between tthe barrel 74 and mandrel 18, enhances and improves the uniformity of feed material around the annular space. The size of the air ports 108, the speed of rotation of the ring 100, and the amount of air or other gas injected through the ports 108 may of course vary with the size of the tubing to be manufactured as well as the size of the particulate feed material, but these factors may be easily determined and adjusted in setting up the apparatus and procedures. In addition, various shaped inserts may be disposed in the ring 100 to vary these factors conveniently during operation.

With the feed material 83 in preforming position, as shown in the drawing, the ram 22 and mandrel 18 are in retracted or feed position with respect to the barrel 74. At this time the piston 44 is actuated by means of an air supply connected to the air port 62, and the piston 26 actuated by way of an air supply connected with the air port 40 to force both the ram 22 and the mandrel 18 down against the feed material 83, thereby compacting the feed material 83 while at the same time moving the tubing 82 a predetermined distance through the barrel 74. Preferably, the air supply actuating the mandrel 18 is independently controlled with respect to the air supply actuating the ram 22, thereby permitting the ram 22 and the mandrel 18 to be moved at relatively different speeds if desired. Independent control of the air supplies permits better control of the pressure exerted on the tubing 82 being extruded, and consequently better control of the characteristics of the tubing produced. By providing independent movement of the mandrel 18 with respect to the ram 22, the friction of the tubing 82 against the mandrel 18 may be eliminated entirely or may be controlled at some intermediate point.

After the ram 22 and the mandrel 18 have reached compaction position, the mandrel 18 is retracted to its original feed position while the compaction of the ram 22 is maintained. Consequently, the only wall friction which need be overcome at one time is the friction of the tubing 82 against the mandrel 18, or against the barrel 74, but not both. After the mandrel 18 is retracted to its feed position by actuation of an air supply to the air inlet 38, the ram 22 is retracted to its feed position by actuation of an air supply communicating with the air inlet 64. Thus, the apparatus is again in the feed position shown in the drawing, and the above steps may be repeated to extrude tubing substantially continuously.

Suitable controls may be employed, of course, to provide automatic operation of the various air or other power supplies, the cooling system, and the heating system, but these controls can be provided in any conventional or other manner. Further, it will be obvious that the various pressures and temperatures required to operate the apparatus will vary with the particular material extruded as well as with other obvious factors, such as the size of the tubing desired, but these variables can be determined and controlled once a specific apparatus and process is set up.

In the production of tubing made of tetrafluoroethylene, the feed material, and air or gas supplies in contact therewith, should be maintained free of moisture, oil, and other other impurities. The use of compressors employing piston rings without need of oil lubrication, such as rings made of tetrafluoroethylene, if frequently advantageous in this regard. Air dryers may also be advantageously employed. Stainless steel and chromeplated carbon steel are preferred materials of construction for apparatus producing tetrafluoroethylene tubing, but of course other suitable materials may be employed. Further, in the production of tetrafluoroethylene tubing, the mandrel is preferably a cylinder having no taper, at least for most commercial sizes, although a tapered cylinder may be found to be advantageous in some instances.

What is claimed is:

1. Apparatus suitable for extrusion of thin-wall tubing, said apparatus comprising a die of a shape to permit extrusion of tubing therethrough, said die comprising a barrel and a mandrel disposed concentrically within said barrel to form an annular space therein around the longitudinal axis of said die; feeding means for feeding tubing-extrudable feed material into said annular space between said barrel and said mandrel substantially uniformly round said annular space; a ram disposed near one end of said die for compacting said material in said annular space; said ram being movable with respect to both said barrel and said mandrel along the longitudinal axis of said die, and said mandrel being movable with respect to both said barrel and said ram along the longitudinal axis of said die; means for moving said ram with respect to both said barrel and said mandrel; and means for moving said mandrel with respect to both said barrel and said ram.

2. Apparatus as defined in claim 1 wherein said feeding means includes a plurality of gas ports spaced around said annular space to permit introduction of gas into said annular space to help control the uniformity of feed material around said annular space.

3. Apparatus as defined in claim 2 wherein said plurality of gas ports is disposed in a ring rotatable about the longitudinal axis of said die, and said feeding means includes means for rotating said ring.

4. Apparatus as defined in claim 1 wherein said feeding means includes a housing communicating with said annular space, an inlet in said housing and an outlet in said housing whereby tubing-extrudable feed material can be carried into said housing in a stream of gas and the gas can pass out of said housing through said outlet, and a plurality of gas ports spaced around said annular space to permit introduction of gas into said annular space to help control the uniformity of feed material around said annular space as the feed material enters from said housing.

5. Apparatus as defined in claim 4 wherein said plurality of gas ports is disposed in a ring rotatable about the longitudinal axis of said die, and said feeding means includes means for rotating said ring.

6. Apparatus as defined in claim 1 wherein said apparatus includes cooling means sufficiently near said feeding means to help control the uniformity of the feed material around said annular space.

7. Apparatus as defined in claim 1 wherein said mandrel extends beyond the end of said barrel at the tubing-producing end of said die for a distance sufficient to improve the uniformity of diameter and the straightness of tubing produced therein.

8. Apparatus as defined in claim 1 wherein said feeding means includes a housing communiciating with said annular space, an inlet in said housing and an outlet in said housing whereby tubing-extrudable feed material can be carried into said housing in a stream of gas and the gas can pass out of said housing through said outlet, and a plurality of gas ports spaced around said annular space to permit introduction of gas into said annular space to help control the uniformity of feed material around said annular space as the feed material enters from said housing; and said apparatus includes cooling means sufficiently near said feeding means to help control the uniformity of the feed material around said annular space.

9. Apparatus as defined in claim 8 wherein said mandrel extends beyond the end of said barrel at the tubing-producing end of said die for a distance sufficient to improve the uniformity of diameter and the straightness of tubing produced therein.

References Cited

UNITED STATES PATENTS

| 2,953,834 | 9/1960 | Muttart. |
| 2,989,777 | 6/1961 | Barley. |
| 3,002,615 | 10/1961 | Lemelson. |

WILLIAM J. STEPHENSON, Primary Examiner

U.S. Cl. X.R.

18—5